(12) United States Patent  
Martin

(10) Patent No.: US 7,213,862 B1  
(45) Date of Patent: May 8, 2007

(54) ADJUSTABLE ANTI-THEFT LOCKING ASSEMBLY FOR VEHICLE SEATS

(76) Inventor: Robert J. Martin, 612 Jefferson St., Muskogee, OK (US) 74403

( * ) Notice: Subject to any disclaimer, the term of this patent is extended or adjusted under 35 U.S.C. 154(b) by 112 days.

(21) Appl. No.: 11/175,481

(22) Filed: Jul. 7, 2005

(51) Int. Cl.
*B60N 2/08* (2006.01)

(52) U.S. Cl. ..................... 296/65.13; 180/287; 248/429

(58) Field of Classification Search ............. 296/65.13, 296/65.14, 65.15; 248/429; 180/287
See application file for complete search history.

(56) References Cited

U.S. PATENT DOCUMENTS

| | | | |
|---|---|---|---|
| 4,116,297 A | 9/1978 | Ross et al. | |
| 5,213,388 A * | 5/1993 | Baker | 296/65.13 |
| 5,251,465 A | 10/1993 | Hwang | |
| D365,216 S | 12/1995 | Smith | |
| 5,628,215 A | 5/1997 | Brown | |
| 5,644,937 A | 7/1997 | Farino | |
| 6,048,019 A * | 4/2000 | Tauber | 296/65.13 |
| 6,746,071 B2 * | 6/2004 | Farino | 296/65.16 |
| 6,942,273 B1 * | 9/2005 | Jseng | 296/65.15 |

* cited by examiner

*Primary Examiner*—Joseph D. Pape

(57) ABSTRACT

A locking assembly includes a first housing including legs at opposed corners and including a flange extending from a bottom thereof that includes an aperture for receiving a fastener therethrough. The first housing has a pair of slots formed along the top thereof, a third slot medially formed of the pair of slots, defines a cavity therein and has a notch in a rear thereof. A second housing is positional within the first housing and includes a conduit that has a threaded inner surface and guide tracks conjoined to the sidewalls thereof. A mechanism is included for adapting the second housing between retracted and extended positions. A mechanism is included for prohibiting the seat from unintentionally biasing between retracted and extended positions. An actuating arm having is disposed within the third slot, is pivotally connected to the first housing and includes a spring member.

18 Claims, 7 Drawing Sheets

ADJUSTABLE ANTI-THEFT LOCKING ASSEMBLY FOR VEHICLE SEATS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to anti-theft assemblies for vehicles and, more particularly, to an adjustable anti-theft locking assembly for vehicle seats for deterring vehicle theft.

2. Prior Art

Car theft has become a major problem throughout the United States, and many products have been developed to prevent and deter would-be thieves from stealing automobiles and the goods stored therein. The vast majority of products are releasably secured to the control functions of the automobile when the owner leaves the automobile, and are intended to prevent a thief from using the car in a conventional manner. For example, bars may be secured to the steering wheel in a manner preventing a thief from properly steering. Similarly, a rod may be positioned between the steering wheel and the brake pedal, or acceleration pedal, to prevent a thief from properly stopping, steering, or accelerating the vehicle. Devices are also known that may be secured to the gear shift to prevent a thief from shifting the automobile out of "Park".

While prior art devices are generally effective in preventing a thief from operating the automobile once he or she has entered the vehicle, they often fail to provide the deterrent necessary to discourage the thief from damaging the automobile when he or she attempts to enter the automobile. That is, these products do not sufficiently signal the thief that any attempt to steal the automobile will be futile. As such, thieves often break windows and destroy car locks, only to find they cannot operate the automobile due to the theft prevention device. However, these devices do not limit the thieves' access to the seating area, and a thief is therefore provided with a work space in which he or she may steal objects stored within or on the front instrument panel and dashboard.

In addition, these products fail to prevent a thief from stealing goods stored within the automobile, for example, air bags, a stereo system or any items stored within the glove box. Since they are merely secured to the functional components of the automobile, the prior theft prevention devices leave the passenger compartment fully open. As a result, a thief is provided with full access to sit in the seat of the passenger compartment where he or she may steal air bags, stereo equipment, or goods stored in the glove box, despite the fact that the automobile cannot be stolen. The "passenger compartment" may be understood to include, but not be limited to, the seating area, the driver seat, the passenger seat, leg space, the glove compartment, the stereo console and the steering column.

More sophisticated theft prevention devices are also known in the prior art. These devices are commonly based upon complex electronic control systems. Devices of this type generally prevent unauthorized use of the automobile by disabling the car during ignition or after the thief has driven the automobile for a short time. In addition, these devices may also send a warning signal so the automobile owner can locate the stolen vehicle. As with the theft prevention devices discussed above, these electronic devices fail to provide the deterrent necessary to prevent a thief from attempting to steal the automobile. They also leave the passenger compartment open, providing the thief with access to the air bags, stereo equipment and other goods stored in the passenger compartment. Electronic theft prevention devices are also expensive and are often difficult to incorporate into previously existing automobiles. As with prior mechanical theft prevention devices, electronic theft prevention devices do not limit a would-be thief's access to the passenger compartment of the automobile. The thief is, therefore, provided with a work area in which he or she is provided full access to the front instrument panel and dashboard of the vehicle.

Accordingly, a need remains for an adjustable anti-theft locking assembly for vehicle seats in order to overcome the above-noted shortcomings. The present invention satisfies such a need by providing an anti-theft vehicle seat locking assembly that is easy to use, imparts theft protection to the vehicle, and is cost-effective. Such an assembly slides the vehicle's seats beneath the dashboard and locks the seatbacks there against, or against the steering wheel in the case of the driver's seat. Thus, the vehicle is rendered inoperable and useless to a potential car thief. This keeps insurance costs down, prevents loss of personal property, and eliminates the hassle of recovering a stolen car. The adjustable anti-theft locking assembly for vehicle seats provides motorists with peace of mind, especially in high-crime areas. Such an assembly is reliable, highly effective, simple to operate, and easily adapted to a wide range of vehicles.

BRIEF SUMMARY OF THE INVENTION

In view of the foregoing background, it is therefore an object of the present invention to provide an adjustable anti-theft locking assembly for vehicle seats. These and other objects, features, and advantages of the invention are provided by an adjustable locking assembly for deterring vehicle theft.

The locking assembly includes a first housing including a plurality of monolithically formed legs oppositely spaced at opposed corners. Such legs each include a monolithically formed flange portion extending orthogonally from a bottom portion thereof. The flange portions each include an aperture formed centrally therein for receiving a fastening member therethrough such that the first housing can advantageously and effectively be removably and directly secured to a support surface of a vehicle and maintained at a substantially stable position during operating conditions.

The first housing also has a pair of coextensive and oppositely spaced slots formed in a top surface thereof. Such a first housing has a third slot medially formed of the pair of slots. The first housing defines a cavity therein and has a notch formed in a rear portion thereof such that the notch receives the lower portion of the actuating arm when the second housing is adapted to a retracted position. The first housing may further include a plurality of coextensive notches formed in a front portion thereof. Such notches receive the mounting brackets of the second housing when the seat is at a retracted position.

A second housing is removably positional within the first housing. Such a second housing includes a monolithically formed conduit that has a threaded inner surface and is registered with a centrally oriented longitudinal axis of the second housing. The second housing further includes a plurality of guide tracks directly and medially conjoined to sidewalls thereof and extending along a partial length of the sidewalls. Such guide tracks preferably slidably engage the sidewalls of the first housing when the second housing is adapted between retracted and extended positions. The second housing may further includes a plurality of seat mounting brackets directly connected to a top surface thereof, oppositely spaced at opposed corners thereof and extending vertically therefrom. Such brackets have a generally cylindrical shape for effectively receiving the lower portion of the seat.

A mechanism is included for adapting the second housing between retracted and extended positions such that the second housing slides parallel to the longitudinal axis of the first housing. Such an adapting mechanism includes a pressure transducer directly positioned beneath the vehicle seat. The pressure transducer is responsive to a weight detected on the vehicle seat and transmits a control signal to deactivate the adapting mechanism when the detected weight is equal to or greater than a predetermined weight.

The adapting mechanism preferably includes an electric motor positioned within the first housing. Such a motor includes a linear shaft extending outwardly along a horizontal plane and has a threaded outer surface. The motor is selectively operable between clockwise and counter clockwise rotations. The shaft threadably engages the conduit when the motor is adapted to clockwise rotations such that the second housing is biased to the extended position. The shaft threadably engages the conduit when the motor is adapted to counter clockwise rotations such that the second housing is biased to the retracted position. A wireless remote control unit includes an infrared transmitter and a plurality of switches electrically mated thereto. One of the switches instructs the arm to toggle the seat to a locked position and another switch instructs the arm to toggle the seat to an unlocked position.

A mechanism is included for prohibiting the seat from unintentionally biasing between retracted and extended positions. Such a prohibiting mechanism preferably includes a lever directly and pivotally connected to the sidewalls of the second housing and extending forwardly and orthogonally therefrom. The lever has monolithically formed front and rear portions. The rear portion includes a plurality of monolithically formed flange portions directly connected to the sidewalls and defining a fulcrum axis about which the lever is pivotal.

At least one control switch is directly connected to the second housing and positioned subjacent to the lever for advantageously and effectively toggling the motor between on and off positions such that a user can stop the second housing from being adapted between retracted and extended positions. A user selectively pivots the lever about the fulcrum axis to toggle the motor to an off position. The rear portion directly engages the control switch respectively when the lever is pivoted upwardly.

An actuating arm has monolithically formed upper and lower portions, wherein the lower portion is directly and pivotally connected to the first housing. Such an actuating arm is disposed within the third slot and rearward of the seat. The lower portion includes a spring member extending horizontally and rearwardly therefrom. The upper portion extends vertically from the first housing and effectively provides support to the seat when the second housing is adapted between retracted and extended positions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
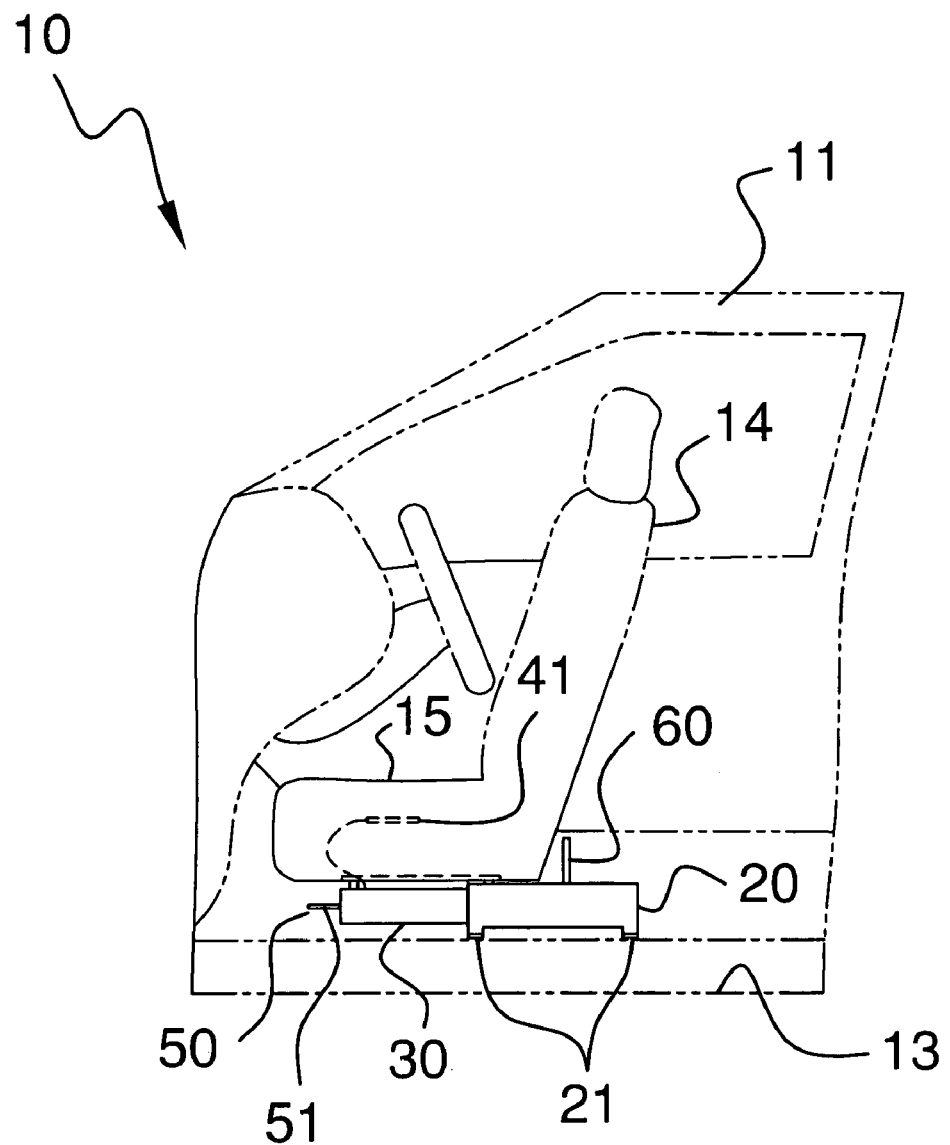
FIG. 1 is a side-elevational view showing an adjustable anti-theft locking assembly for vehicle seats, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–8 by the reference numeral 10 and is intended to provide an adjustable anti-theft locking assembly for vehicle seats. It should be understood that the assembly 10 may be used to adjustably lock many different types of seats and should not be limited in use to only locking vehicle seats.

Figure 2:
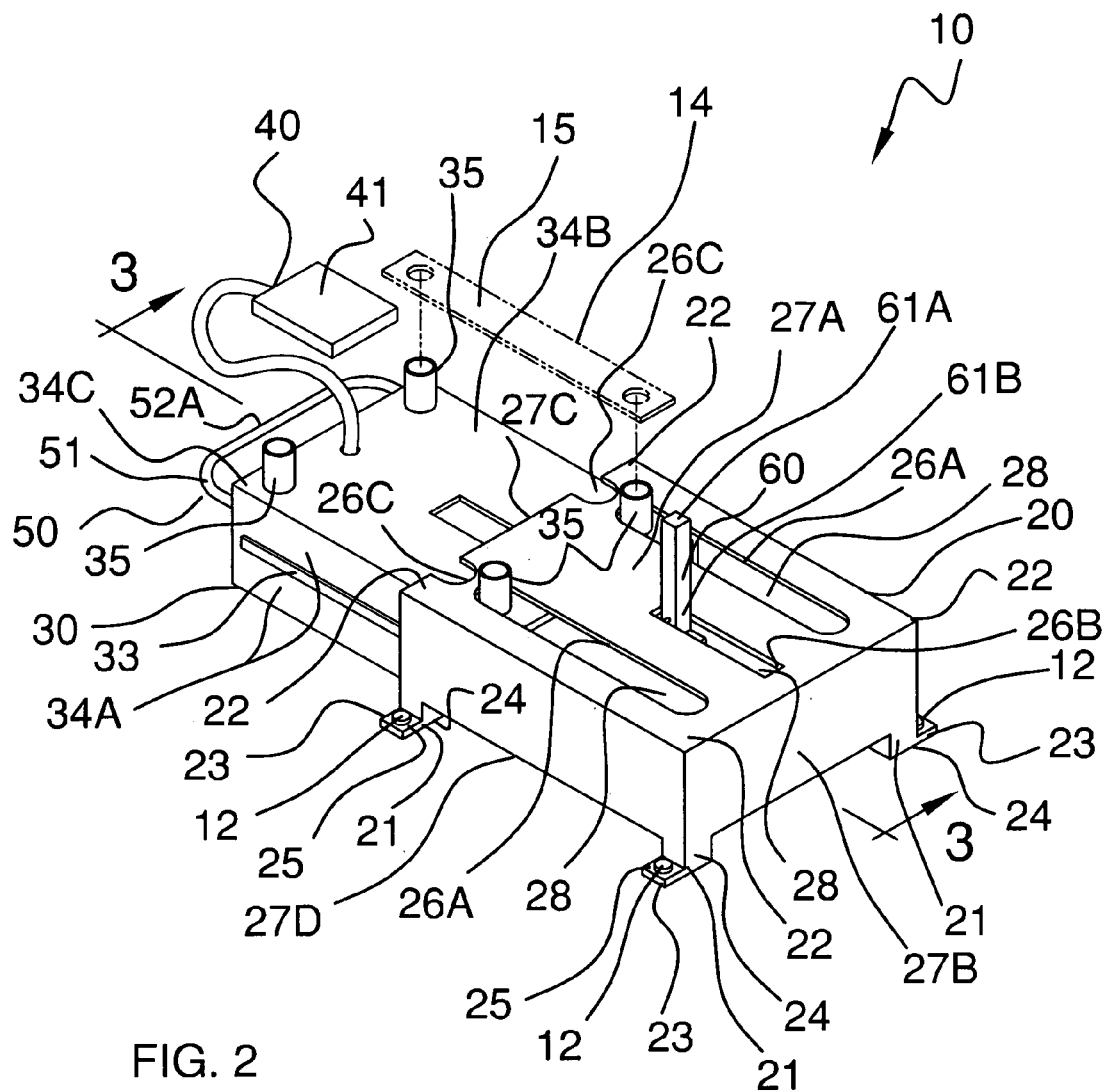
FIG. 2 is a perspective view of the assembly shown in FIG. 1.

Referring initially to FIGS. 1 and 2, the assembly 10 includes a first housing 20 including a plurality of monolithically formed legs 21 oppositely spaced at opposed corners 22. Of course, the legs 21 may be alternately positioned in order to accommodate the installation requirements of various vehicles 11, as is obvious to a person of ordinary skill in the art. Such legs 21 each include a monolithically formed flange portion 23 extending orthogonally from a bottom portion 24 thereof. The flange portions 23 each include an aperture 25 formed centrally therein that are essential for receiving a fastening member 12 therethrough such that the first housing 20 can advantageously and effectively be removably and directly secured, with no intervening elements, to a support surface 13 of a vehicle 11 and maintained at a substantially stable position during operating conditions. The apertures 25 and fastening members 12 advantageously allow the assembly 10 to be easily incorporated into newly produced vehicles 11 or as an aftermarket installation option for older vehicles 11.

Figure 5:
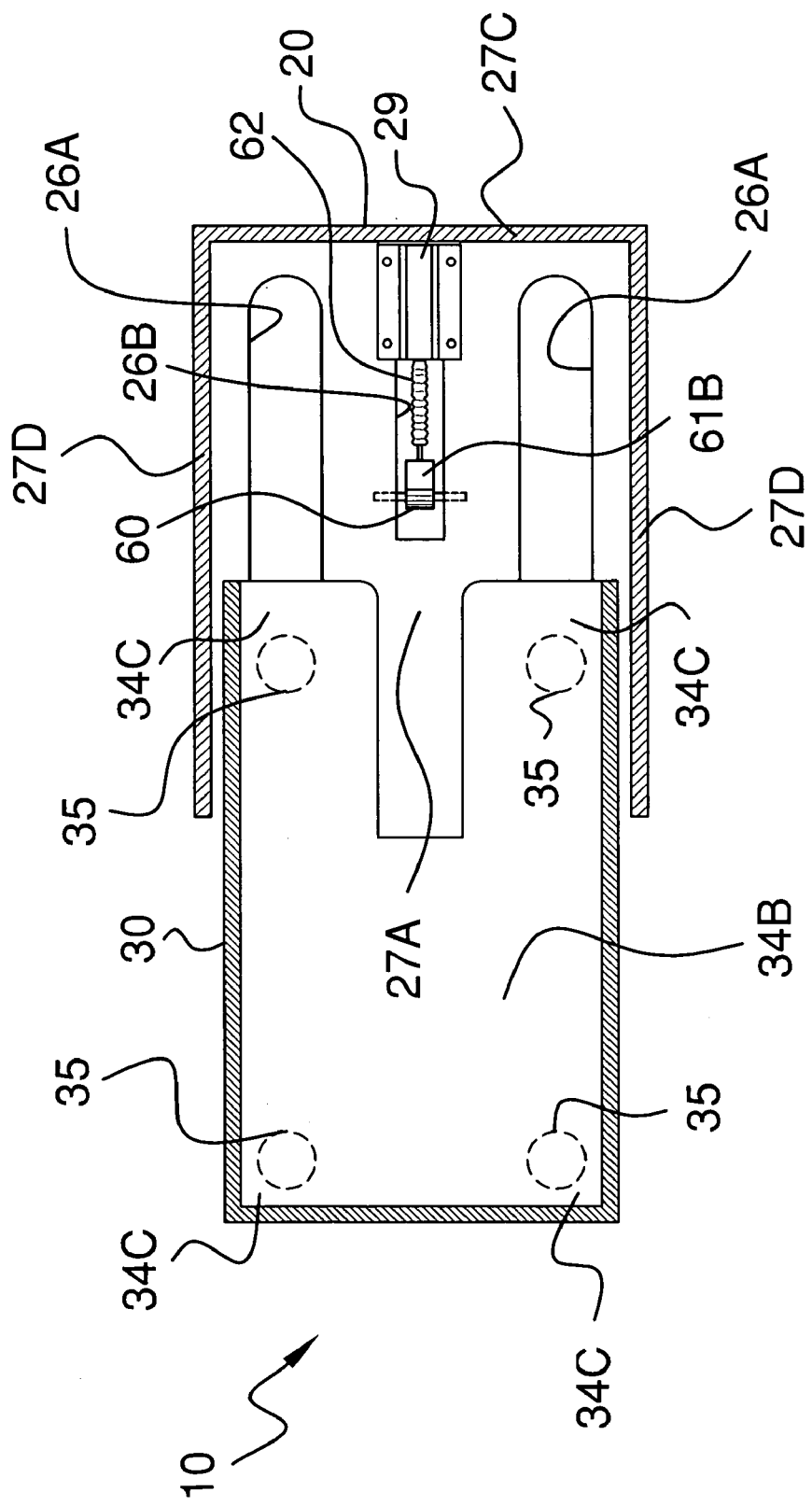
FIG. 5 is a cross-sectional view of the assembly shown in FIG. 3, taken along line 5—5.
Figure 7:
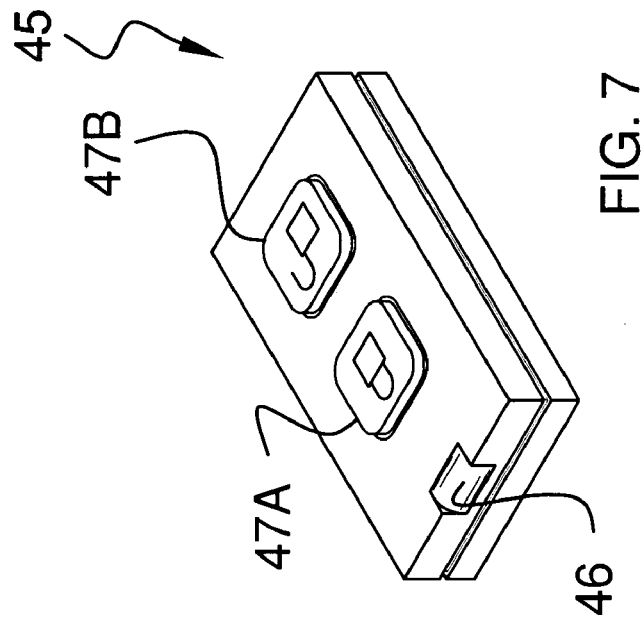
FIG. 7 is a perspective view of the wireless remote control unit, in accordance with the present invention.

Referring to FIGS. 1, 2 and 5, the first housing 20 also has a pair of coextensive and oppositely spaced slots 26A formed in a top surface 27A thereof. Such a first housing 20 has a third slot 26B medially formed of the pair of slots 26A. The first housing 20 defines a cavity 28 therein and has a notch 29 formed in a rear portion 27B thereof such that the notch 29 receives the lower portion 61B of the actuating arm 60 (described herein below) when the second housing 30 (described herein below) is adapted to a retracted position. The first housing 20 further includes a plurality of coextensive notches 26C formed in a front portion 27C thereof. Such notches 26C are crucial for receiving the mounting brackets 35 (described herein below) of the second housing 30 when the seat 14 is at a retracted position so that the seat 14 can advantageously assume a position that is comfortable to the driver for operating the vehicle 11.

Referring to FIGS. 1 through 5, a second housing 30 is removably positional within the first housing 20. Such a second housing 30 includes a monolithically formed conduit 31 that has a threaded inner surface 32 and is registered with a centrally oriented longitudinal axis of the second housing 30. The second housing 30 further includes a plurality of guide tracks 33 directly and medially conjoined, with no intervening elements, to sidewalls 34A thereof and extending along a partial length of the sidewalls 34A, as is best shown in FIG. 2. Such guide tracks 33 slidably engage the sidewalls 27D of the first housing 20 when the second housing 30 is adapted between retracted and extended positions. The second housing 30 further includes a plurality of seat mounting brackets 35 directly connected, with no intervening elements, to a top surface 34B thereof, oppositely spaced at opposed corners 34C thereof and extending vertically therefrom. Such brackets 35 have a generally cylindrical shape and are vital for effectively receiving the lower portion 15 of the seat 14. Of course, the brackets 35 may be alternately shaped for receiving a variety of vehicle seats 14, as is obvious to a person of ordinary skill in the art.

Figure 8:
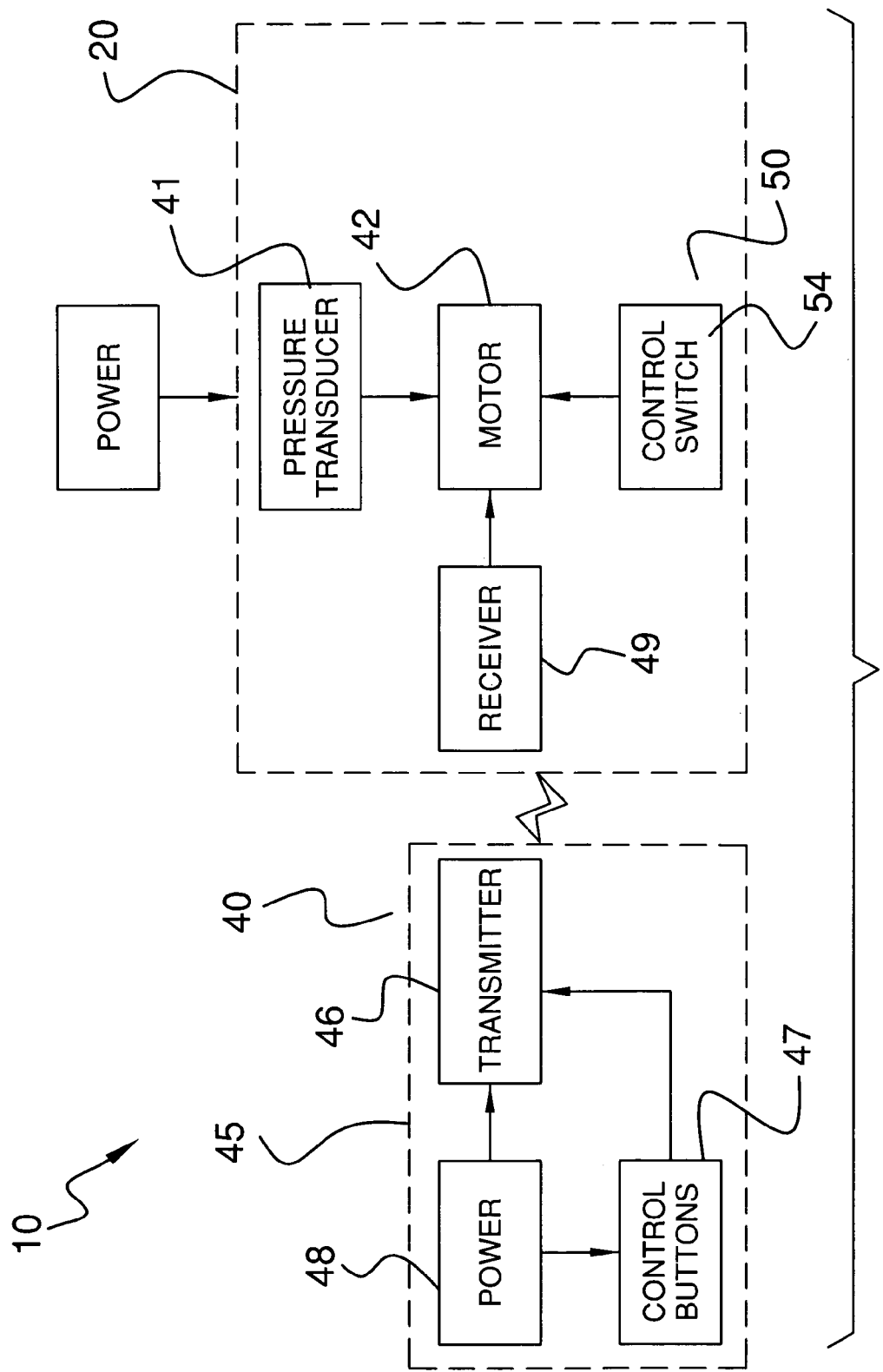
FIG. 8 is a schematic block diagram of the assembly shown in FIG. 1.

Referring to FIGS. 1, 2 and 8, a mechanism 40 is included for adapting the second housing 30 between retracted and extended positions such that the second housing 30 slides parallel to the longitudinal axis of the first housing 20. Such an adapting mechanism 40 includes a pressure transducer 41 directly positioned, with no intervening elements, beneath the vehicle seat 14, as is best shown in FIG. 1. The pressure transducer 41 is responsive to a weight detected on the vehicle seat 14 and transmits a control signal to deactivate the adapting mechanism 40 when the detected weight is equal to or greater than a predetermined weight. This feature is advantageous and important for preventing a vehicle seat 14 from extending while a vehicle operator is positioned therein.

Figure 3:
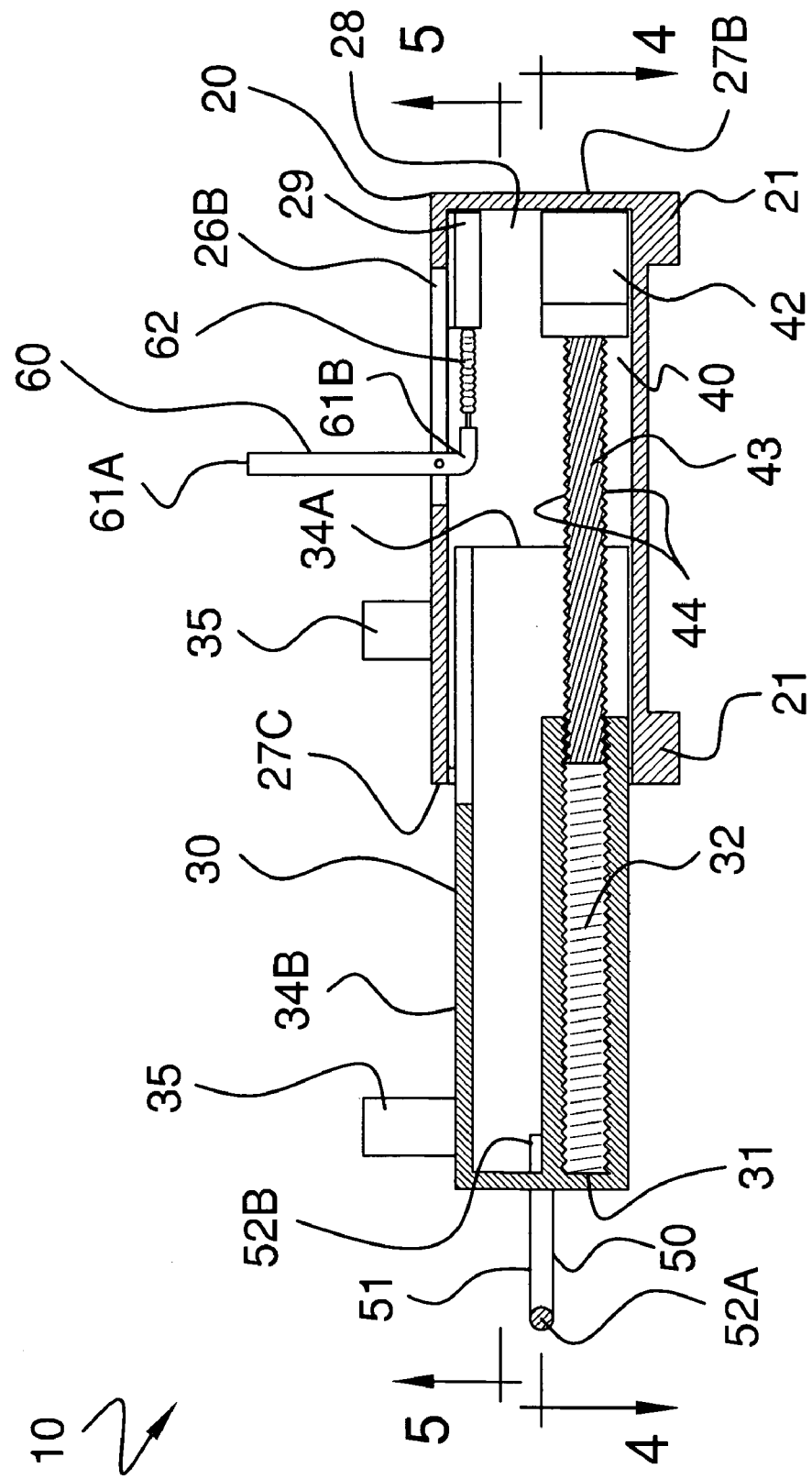
FIG. 3 is a cross-sectional view of the assembly shown in FIG. 1, taken along line 3—3.
Figure 4:
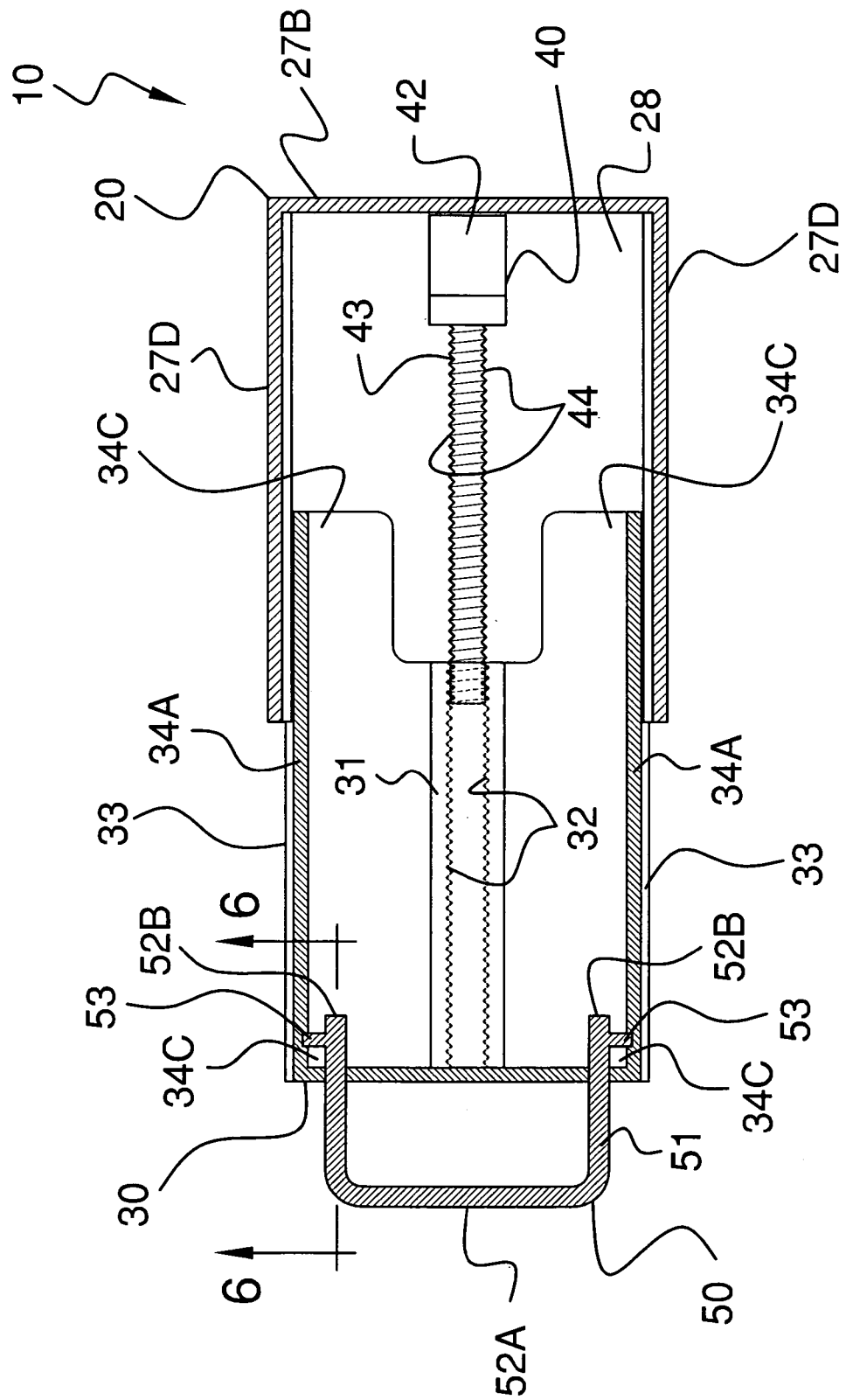
FIG. 4 is a cross-sectional view of the assembly shown in FIG. 3, taken along line 4—4.

Referring to FIGS. 3, 4 and 8, the adapting mechanism 40 further includes an electric motor 42 positioned within the first housing 20. Such a motor 42 includes a linear shaft 43 extending outwardly along a horizontal plane and has a threaded outer surface 44. The motor 42 is selectively operable between clockwise and counter clockwise rotations. The shaft 43 threadably engages the conduit 31 when the motor 42 is adapted to clockwise rotations such that the second housing 30 is biased to the extended position. At such an extended position, illustrated in FIG. 1, an unauthorized person advantageously can not gain access to the vehicle seat 14 in order to properly operate the vehicle 11, thus preventing the theft thereof. Of course, the assembly 10 can also be incorporated into a front passenger vehicle seat, as is obvious to a person of ordinary skill in the art.

Upon adapting the passenger vehicle seat (not shown) to the extended position, access to a glove compartment box (not show) is impeded, further discouraging an unauthorized person from forcibly gaining access to the vehicle 11. The shaft 43 threadably engages the conduit 31 when the motor 42 is adapted to counter clockwise rotations such that the second housing 30 is biased to the retracted position.

A wireless remote control unit 45 includes an infrared transmitter 46 and a plurality of switches 47 electrically mated thereto. One of the switches 47A instructs the arm to toggle the seat 14 to a locked position and another switch 47B instructs the arm to toggle the seat 14 to an unlocked position. The control unit 45 further includes a power supply source 48 that is electrically coupled to the transmitter 46 and the plurality of switches 47. A receiver 49 is electrically coupled to the motor 42 for allowing the control unit 45 to wirelessly communicate with the motor 42.

Referring to FIGS. 1, 2, 3, 4, 6 and 8, a mechanism 50 is included for advantageously prohibiting the seat 14 from unintentionally biasing between retracted and extended positions. Such a prohibiting mechanism 50 includes a lever 51 directly and pivotally connected, with no intervening elements, to the sidewalls 34A of the second housing 20 and extending forwardly and orthogonally therefrom. The lever 51 has monolithically formed front 52A and rear 52B portions. The rear portions 52B each include a monolithically formed flange portion 53 directly connected, with no intervening elements, to the sidewalls 34A and defining a fulcrum axis about which the lever 51 is pivotal.

Figure 6:
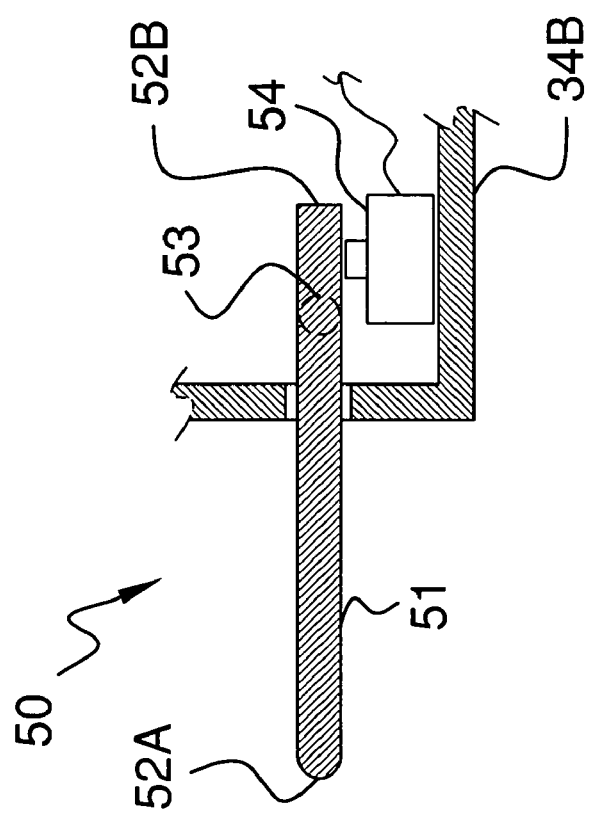
FIG. 6 is a cross-sectional view of the prohibiting mechanism shown in FIG. 4, taken along line 6—6.

Referring to FIGS. 6 and 8, at least one control switch 54 is directly connected, with no intervening elements, to the second housing 20 and positioned subjacent to the lever 51 for advantageously and effectively toggling the motor 42 between on and off positions, which is critical such that a user can stop the second housing 20 from being adapted between retracted and extended positions. A user selectively pivots the lever 51 about the fulcrum axis to effectively and conveniently toggle the motor 42 to an off position. The rear portion 52B directly engages, with no intervening elements, the control switch 54 respectively when the lever 51 is pivoted upwardly.

Referring to FIGS. 1, 2, 3 and 5, an actuating arm 60 has monolithically formed upper 61A and lower 61B portions, wherein the lower portion 61B is directly and pivotally connected, with no intervening elements, to the first housing 20. Such an actuating arm 60 is disposed within the third slot 26B and rearward of the seat 14, as is best shown in FIG. 1.

The lower portion 61B includes a spring member 62 extending horizontally and rearwardly therefrom. The upper portion 61A extends vertically from the first housing 20 and effectively provides support to the seat 14 when the second housing 30 is adapted between retracted and extended positions.

In use, when a vehicle operator has parked and exited the vehicle 11, the one switch 47A of the remote control unit 45 is pressed to activate the assembly 10. The electric motor 42 is activated and rotates the shaft 43 in a clockwise direction, which in turn engages the conduit 31 to effectively extend the second housing 30 and thus, the vehicle seat 14. When returning to the vehicle 11, the operator presses the other switch 47B effectively causing the motor 42 and shaft 43 to rotate in a counterclockwise fashion. The counterclockwise rotation of the shaft 43 within the conduit 31 effectively causes the second housing 30 to retract, allowing the operator to be seated in the vehicle seat 14.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An adjustable locking assembly for deterring vehicle theft, said locking assembly comprising:
   a first housing including a plurality of monolithically formed legs oppositely spaced at opposed corners, said legs each including a monolithically formed flange portion extending orthogonally from a bottom portion thereof, said flange portions each including an aperture formed centrally therein for receiving a fastening member therethrough such that said first housing can be removably and directly secured to a support surface of a vehicle and maintained at a substantially stable position during operating conditions, said first housing having a pair of coextensive and oppositely spaced slots formed in a top surface thereof, said first housing further having a third slot medially formed of said pair of slots, said first housing defining a cavity therein;
   a second housing removably positional within said first housing, said second housing including a monolithically formed conduit having a threaded inner surface and registered with a centrally oriented longitudinal axis of said second housing, said second housing further including a plurality of guide tracks directly and medially conjoined to sidewalls thereof and extending along a partial length of the sidewalls;
   means for adapting said second housing between retracted and extended positions such that said second housing slides parallel to the longitudinal axis of said first housing;
   means for prohibiting said seat from unintentionally biasing between retracted and extended positions; and
   an actuating arm having monolithically formed upper and lower portions directly and pivotally connected to said first housing and disposed within said third slot and rearward of the seat, said lower portion including a spring member extending horizontally and rearwardly therefrom, said upper portion extending vertically from said first housing and providing support to the seat when said second housing is adapted between retracted and extended positions.

2. The seat of claim 1, wherein said adapting means comprises:
   an electric motor positioned within said first housing, said motor including a linear shaft extending outwardly along a horizontal plane and having a threaded outer surface, said motor being selectively operable between clockwise and counter clockwise rotations, said shaft threadably engaging the conduit when said motor is adapted to clockwise rotations such that said second housing is biased to the extended position, said shaft threadably engaging the conduit when said motor is adapted to counter clockwise rotations such that said second housing is biased to the retracted position;
   a wireless remote control unit including an infrared transmitter and a plurality of switches electrically mated thereto, one said switches instructing said arm to toggle the seat to a locked position, another said switches instructing said arm to toggle the seat to an unlocked position.

3. The seat of claim 1, wherein said prohibiting means comprises:
   a lever directly and pivotally connected to the sidewalls of said second housing and extending forwardly and orthogonally therefrom, said lever having monolithically formed front and rear portions, said rear portion including a plurality of monolithically formed flange portions directly connected to said sidewalls and defining a fulcrum axis about which said lever is pivotal;
   at least one control switch directly connected to said second housing and positioned subjacent said lever for toggling said motor between on and off positions such that a user can stop said second housing from being adapted between retracted and extended positions; and
   wherein a user selectively pivots said lever about the fulcrum axis to toggle said motor to an off position, said rear portion directly engaging said control switch respectively when said lever is pivoted upwardly.

4. The seat of claim 1, wherein said second housing further includes a plurality of seat mounting brackets directly connected to a top surface of said second housing and oppositely spaced at opposed corners thereof and extending vertically from said second housing, said brackets having a generally cylindrical shape for receiving said lower portion of said seat.

5. The seat of claim 1, wherein said guide rails slidably engage said sidewalls of said first housing when said second housing is adapted between retracted and extended positions.

6. The seat of claim 1, wherein said first housing includes a plurality of coextensive notches formed in a front portion thereof, said notches receiving said mounting brackets of said second housing when said seat is at a retracted position.

7. An adjustable locking assembly for deterring vehicle theft, said locking assembly comprising:
   a first housing including a plurality of monolithically formed legs oppositely spaced at opposed corners, said legs each including a monolithically formed flange portion extending orthogonally from a bottom portion thereof, said flange portions each including an aperture formed centrally therein for receiving a fastening member therethrough such that said first housing can be removably and directly secured to a support surface of a vehicle and maintained at a substantially stable position during operating conditions, said first housing having a pair of coextensive and oppositely spaced slots formed in a top surface thereof, said first housing further having a third slot medially formed of said pair of slots, said first housing defining a cavity therein, said first housing having a notch formed in a rear portion thereof such that said the notch receives said lower portion of said actuating arm when said second housing is adapted to a retracted position;

a second housing removably positional within said first housing, said second housing including a monolithically formed conduit having a threaded inner surface and registered with a centrally oriented longitudinal axis of said second housing, said second housing further including a plurality of guide tracks directly and medially conjoined to sidewalls thereof and extending along a partial length of the sidewalls;

means for adapting said second housing between retracted and extended positions such that said second housing slides parallel to the longitudinal axis of said first housing;

means for prohibiting said seat from unintentionally biasing between retracted and extended positions; and an actuating arm having monolithically formed upper and lower portions directly and pivotally connected to said first housing and disposed within said third slot and rearward of the seat, said lower portion including a spring member extending horizontally and rearwardly therefrom, said upper portion extending vertically from said first housing and providing support to the seat when said second housing is adapted between retracted and extended positions.

8. The seat of claim 7, wherein said adapting means comprises:

an electric motor positioned within said first housing, said motor including a linear shaft extending outwardly along a horizontal plane and having a threaded outer surface, said motor being selectively operable between clockwise and counter clockwise rotations, said shaft threadably engaging the conduit when said motor is adapted to clockwise rotations such that said second housing is biased to the extended position, said shaft threadably engaging the conduit when said motor is adapted to counter clockwise rotations such that said second housing is biased to the retracted position; and a wireless remote control unit including an infrared transmitter and a plurality of switches electrically mated thereto, one said switches instructing said arm to toggle the seat to a locked position, another said switches instructing said arm to toggle the seat to an unlocked position.

9. The seat of claim 7, wherein said prohibiting means comprises:

a lever directly and pivotally connected to the sidewalls of said second housing and extending forwardly and orthogonally therefrom, said lever having monolithically formed front and rear portions, said rear portion including a plurality of monolithically formed flange portions directly connected to said sidewalls and defining a fulcrum axis about which said lever is pivotal;

at least one control switch directly connected to said second housing and positioned subjacent said lever for toggling said motor between on and off positions such that a user can stop said second housing from being adapted between retracted and extended positions; and wherein a user selectively pivots said lever about the fulcrum axis to toggle said motor to an off position, said rear portion directly engaging said control switch respectively when said lever is pivoted upwardly.

10. The seat of claim 7, wherein said second housing further includes a plurality of seat mounting brackets directly connected to a top surface of said second housing and oppositely spaced at opposed corners thereof and extending vertically from said second housing, said brackets having a generally cylindrical shape for receiving said lower portion of said seat.

11. The seat of claim 7, wherein said guide rails slidably engage said sidewalls of said first housing when said second housing is adapted between retracted and extended positions.

12. The seat of claim 7, wherein said first housing includes a plurality of coextensive notches formed in a front portion thereof, said notches receiving said mounting brackets of said second housing when said seat is at a retracted position.

13. An adjustable locking assembly for deterring vehicle theft, said locking assembly comprising:

a first housing including a plurality of monolithically formed legs oppositely spaced at opposed corners, said legs each including a monolithically formed flange portion extending orthogonally from a bottom portion thereof, said flange portions each including an aperture formed centrally therein for receiving a fastening member therethrough such that said first housing can be removably and directly secured to a support surface of a vehicle and maintained at a substantially stable position during operating conditions, said first housing having a pair of coextensive and oppositely spaced slots formed in a top surface thereof, said first housing further having a third slot medially formed of said pair of slots, said first housing defining a cavity therein, said first housing having a notch formed in a rear portion thereof such that said the notch receives said lower portion of said actuating arm when said second housing is adapted to a retracted position;

a second housing removably positional within said first housing, said second housing including a monolithically formed conduit having a threaded inner surface and registered with a centrally oriented longitudinal axis of said second housing, said second housing further including a plurality of guide tracks directly and medially conjoined to sidewalls thereof and extending along a partial length of the sidewalls;

means for adapting said second housing between retracted and extended positions such that said second housing slides parallel to the longitudinal axis of said first housing, wherein said adapting means comprises a pressure transducer directly positioned beneath the vehicle seat, said pressure transducer being responsive to a weight detected on the vehicle seat and transmitting a control signal to deactivate said adapting means when the detected weight is equal to or greater than a predetermined weight;

means for prohibiting said seat from unintentionally biasing between retracted and extended positions; and an actuating arm having monolithically formed upper and lower portions directly and pivotally connected to said first housing and disposed within said third slot and rearward of the seat, said lower portion including a spring member extending horizontally and rearwardly therefrom, said upper portion extending vertically from said first housing and providing support to the seat when said second housing is adapted between retracted and extended positions.

14. The seat of claim 13, wherein said adapting means comprises:

an electric motor positioned within said first housing, said motor including a linear shaft extending outwardly along a horizontal plane and having a threaded outer surface, said motor being selectively operable between clockwise and counter clockwise rotations, said shaft threadably engaging the conduit when said motor is adapted to clockwise rotations such that said second housing is biased to the extended position, said shaft threadably engaging the conduit when said motor is adapted to counter clockwise rotations such that said second housing is biased to the retracted position; and a wireless remote control unit including an infrared transmitter and a plurality of switches electrically mated thereto, one said switches instructing said arm to toggle the seat to a locked position, another said switches instructing said arm to toggle the seat to an unlocked position.

15. The seat of claim 13, wherein said prohibiting means comprises:

a lever directly and pivotally connected to the sidewalls of said second housing and extending forwardly and orthogonally therefrom, said lever having monolithically formed front and rear portions, said rear portion including a plurality of monolithically formed flange portions directly connected to said sidewalls and defining a fulcrum axis about which said lever is pivotal;

at least one control switch directly connected to said second housing and positioned subjacent said lever for toggling said motor between on and off positions such that a user can stop said second housing from being adapted between retracted and extended positions; and wherein a user selectively pivots said lever about the fulcrum axis to toggle said motor to an off position, said rear portion directly engaging said control switch respectively when said lever is pivoted upwardly.

16. The seat of claim 13, wherein said second housing further includes a plurality of seat mounting brackets directly connected to a top surface of said second housing and oppositely spaced at opposed corners thereof and extending vertically from said second housing, said brackets having a generally cylindrical shape for receiving said lower portion of said seat.

17. The seat of claim 13, wherein said guide rails slidably engage said sidewalls of said first housing when said second housing is adapted between retracted and extended positions.

18. The seat of claim 13, wherein said first housing includes a plurality of coextensive notches formed in a front portion thereof, said notches receiving said mounting brackets of said second housing when said seat is at a retracted position.

* * * * *